United States Patent [19]
Luitz et al.

[11] Patent Number: 5,636,856
[45] Date of Patent: Jun. 10, 1997

[54] SUPPORT DEVICE BETWEEN THE SOLE OF A BOOT AND A PIECE OF SPORTS APPARATUS

[75] Inventors: Max Luitz, Blaichach-Bihlerdorf; Hans Frick, Wiggensbach, both of Germany

[73] Assignee: Atomic Austria GmbH, Altenmarkt im Pongau, Austria

[21] Appl. No.: 379,978

[22] Filed: Jan. 27, 1995

[30] Foreign Application Priority Data

Jan. 28, 1994 [AT] Austria ................................. A 167/94

[51] Int. Cl.⁶ ........................................................ A63C 9/08
[52] U.S. Cl. ............................ 280/607; 280/618; 280/636
[58] Field of Search ................................. 280/607, 617, 280/618, 636, 602, 633, 634

[56] References Cited

U.S. PATENT DOCUMENTS

| 4,398,747 | 8/1983 | Bernard et al. ........................ 280/636 |
| 4,889,358 | 12/1989 | Rullier ................................ 280/636 X |
| 4,911,463 | 3/1990 | Gertsch .............................. 280/618 X |
| 4,928,990 | 5/1990 | Rullier ................................ 280/636 |

FOREIGN PATENT DOCUMENTS

| 1578818 | 12/1970 | Germany. |
| 2234048 | 3/1973 | Germany. |
| 2832121 | 1/1980 | Germany. |
| 4003536 | 8/1990 | Germany. |
| 3918922 | 12/1990 | Germany. |

Primary Examiner—Brian L. Johnson
Assistant Examiner—Michael Mar
Attorney, Agent, or Firm—Collard & Roe, P.C.

[57] ABSTRACT

The invention describes a support device (6) between the sole (9) of a boot (4) and a piece of sports apparatus, in particular a ski (5). Between the toe clamp and a heel clamp (1, 2) of a coupling device (3) a housing (22) is arranged which is mounted on the ski (5). In the housing (22) a running plate (32) is provided which is motionally mounted transversely to the longitudinal direction of the ski from a position of rest against the effect of a readjusting force brought about by a spring device (48). The housing (22) is mounted on the ski (5) in an end section facing towards the toe clamp and/or the heel clamp (1, 2) in a predeterminable position vertically to the surface (10) and in an opposite end section relative to the surface (10) and is mounted freely, adjustable vertically to the latter. Or the housing (22) is mounted on a freely moving spacer (13) connecting the toe clamp and the heel clamp (1, 2) in a vertical direction relative to the surface (10).

23 Claims, 5 Drawing Sheets

Fig.11

SUPPORT DEVICE BETWEEN THE SOLE OF A BOOT AND A PIECE OF SPORTS APPARATUS

BACKGROUND OF THE INVENTION

1. Field of the Invention

The invention relates to a support device between the sole of a boot and a piece of sports apparatus, in particular a ski, as described in the introductory clause of claim 1.

2. The Prior Art

Support devices are already known wherein a base plate is secured relative to a surface of the ski and a running plate which supports the sole is displaceably mounted in a plane running parallel to the surface of the ski and transverse to longitudinal extension thereof.

In such a known support device—according to DE-A-15 78 818—the running plate can be adjusted with respect to the base plate against a spring force, for example a meander-shaped leaf spring or elastic clamping element, which after the running plate is guided out of a central position causes an automatic return to the central position.

In a further known support device—according to DE-A-22 34 048—in order to reduce the friction between a base plate or respectively a housing secured to the ski and a running plate which is displaceable with respect to the housing, a ball-receiving cage is arranged which is supported in the longitudinal direction of the ski by a bending element through which after the running plate is guided towards the side and thereby also towards the cage, causes a return into the central position. In this embodiment the large number of components and the immovable connection of the support devices to the ski or respectively its surface, is diadvantageous because the guiding processes have values, which, due to the stress-related change of form, in particular when the ski is bent through, based on the variation of stresses by the sole, cannot be reproduced.

SUMMARY OF THE INVENTION

It is an object of the invention to create a support device which under all possible running conditions has the same displacement and readjusting behaviour and which can be adapted to the present binding systems.

This object of the invention is solved by the features of claim 1. The surprising advantage is thereby that due to the adjustability of the support device together with the free mobility of the spacer perpendicular to the surface of the ski, the relative position of the support device with respect to the contact face of the sole of the boot causes no changes of contact between the sole and the running plate when the ski is deformed as for example when the ski is bent through, and thereby the same force ratio is achieved between the readjusting moments of the toe clamp and the running plate on the boot against an unintentional release during short knocks.

Thereby, an object of the invention is made possible wherein the housing of the support device constitutes a pannelling element which prevents an accumulation of snow, dirt etc. between the spacer and the surface of the ski.

According to an advantageous further development, a characteristic of rotation is achieved by the adjustability of the running plate also during stress peaks, if the sole of the boot is soiled for example by sand or if gravel adheres to it. This way, independently of the actual coefficient of friction between the sole and the running plate, the moment of torsion set as release value and required for the release of the release binding is maintained and any risk of injury reduced.

Thereby, another object of the invention is advantageous, because thereby the technically costly and cost-intensive guidance is given which ensures high operational safety.

By an advantageous further development a safer reception and mounting is achieved when sudden increases of load affect the running plate which bring about a short-waved pendulum movement around the central position.

According to an advantageous further development, overlapping regions in which snow, ice, etc, can accumulate are effectively prevented.

A different object of the invention is also advantageous, because thereby, independently of the relative position of the running plate to the housing an effective covering of further function elements is achieved.

However, another object of the invention is also possible because thereby a pre-settable excursion of the running plate is ensured around its central position.

According to a further advantageous development of an embodiment, a return of the running plate into its position of rest is ensured after the release binding has been released.

According to a further advantageous development according to a different object of the invention, additional components are avoided and the mounting expenditure for the support device is reduced.

However, an embodiment of another object of the invention is also possible because thereby an initial tension of the spring device is achieved which ensures a tight and effective grip independently of weather conditions, such as snow, ice, etc.

According to a possible development of a different object of the invention, a progressive spring effect is achieved in that during adjustment of the running element along the entire adjustment path, the spring force of a spring arm and of another spring arm becomes successively effective.

Another advantageous object of the invention achieves higher readjusting forces in that the meander-shaped plastic part exerts tensile and pressure forces at an excursion from the central position into the readjusting direction of the dog.

A different object of the invention is also possible because thereby a cost-effective embodiment of the tools which are required for the production of the housing, is achieved.

According to the advantageous further development described in another object of the invention, a safe function for the readjustment is given even of one spring arm fails whereby it is moreover possible to provide altogether a higher adjusting force.

According to a different object of the invention, an exact predefined relative position between the housing and the spacer which holds the latter, is achieved.

Furthermore, another object of the invention is also possible, because thereby additional fastening elements and mounting processes connected therewith can be saved.

However, a different object of the invention is also advantageous according to which the safely locked state of a lengthwise adjusting device provided in the spacer can be controlled by the housing.

An advantageous further development is also described wherein the free adjustability of the spacer in a direction perpendicular to the surface of the ski can be achieved.

According to an advantageous further development according to a different object of the invention, an expensive positioning during assembly is avoided.

By another object of the invention, a cost-effective production for a series fabrication is achieved.

According to a possible further development, disturbing influences, for example by foreign bodies which protrude the contact surface of the sole or respectively are located between the sole and the running plate, such as stones, etc. are eliminated.

Finally, a different object of the invention is also advantageous because thereby the running plate is safely taken along when the sole moves sidewards.

BRIEF DESCRIPTION OF THE DRAWINGS

For better understanding, the invention will now be described hereinafter, by way of example only, with reference to the accompanying drawings, in which.

DETAILED DESCRIPTION OF PREFERRED EMBODIMENTS

Figure 1:
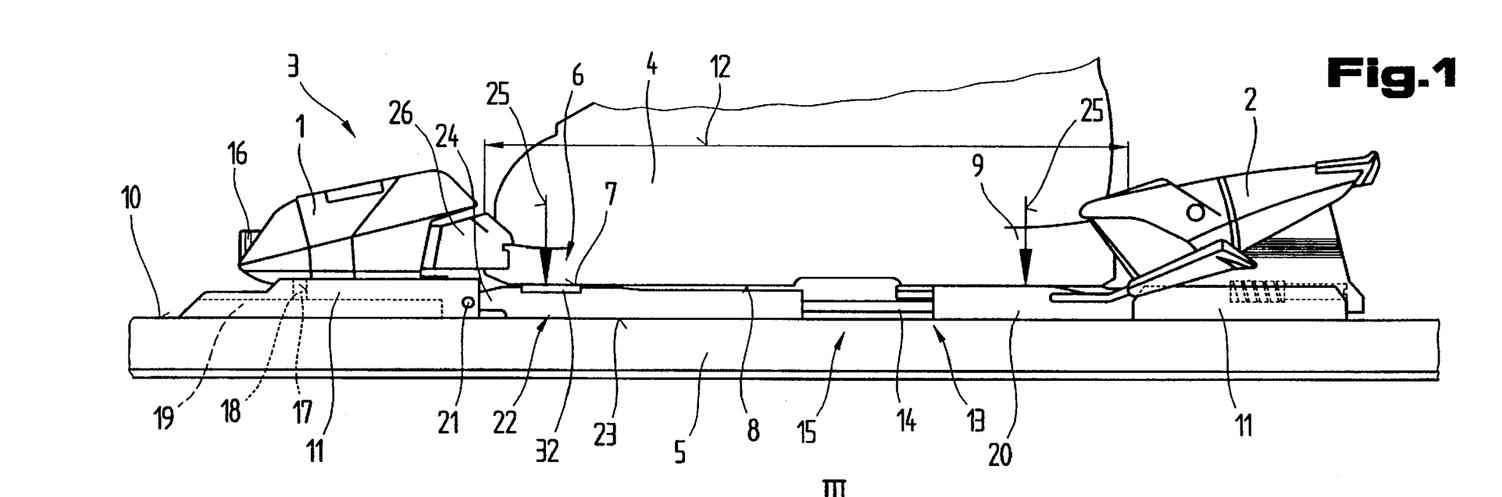
FIG. 1 is a view of a coupling device between a boot and a ski with a support device in accordance with the invention.

FIG. 1 shows a coupling device 3 constituted by a toe clamp 1 and a heel clamp 2 to secure a boot 4, in particular a ski boot to a piece of sports apparatus, for example a ski 5. In the region between the toe clamp 1 and the heel clamp 2 a support device 6 is arranged which forms a support face 7 for a contact surface 8 of a sole 9 of the boot 4.

The toe clamp 1 and the heel clamp 2 are adjustably mounted by means of guiding arrangements 11 in the longitudinal direction of the ski 5, which run in the longitudinal direction of the ski 5 and are secured to a surface 10 of the latter. A distance 12 between the toe clamp 1 and the heel clamp 2 is defined by a spacer 13 arranged therebetween, for example a connecting strap 14. By the arrangement of a lengthwise adjusting device 15, for example between a strap formed in two parts or between the spacer 13 and the toe clamp 1 and/or the heel clamp 2, the distance 12 can be matched to a boot size. In order to position the coupling device 3 with respect to the ski 5 in the longitudinal direction of the ski, the toe clamp 1 or the heel clamp 2 has a positioning device 16, for example a plunger pin 17 which is adjustably mounted relative to the toe clamp 1 in vertical direction to the surface 10, which in a fixing position engages in a recess 18 of the base plate 19 which forms the guiding arrangement 11. By arranging several recesses 18 being spaced apart from one another in the longitudinal direction of the ski, the relative position of the coupling device 3 with respect to the ski 5 can be changed as required.

The tension forces which occur in the coupling device 3 when the boot 4 is fixed between the toe clamp 1 and the heel clamp 2 are taken up as tensile forces by the connecting strap 14 and thus a bracing of the ski 5 is prveneted. Thereby, the elastic deformability in the region of the coupling device 3 is also ensured and an adaptation of the ski 5 to the ground conditions is achieved.

To support the boot 4 in a fixed position in the coupling device 3, in the region of the heel clamp 2 and surrounding the connecting strap 14 laterally and in the direction of the sole 9, a support plate 20 is arranged which bears on a surface 10 of the ski 5.

On the toe clamp 1 via an articulation arrangement 21 a support device 6 of the sole 9 extends in the direction of the heel clamp 2 and is guided in a displaceable manner in the vertical direction to the surface 10 of the ski 5. The support device 6 presents a housing 22 formed by a C-shaped profile, which extends in the longitudinal direction of the ski and which by means of shanks 23 encompasses laterally the connecting strap 14 and by means of a web 24 running between the connecting strap 14 and the sole 9 encompasses the latter.

By means of the support plate 20 or respectively the support device 6 supporting forces according to arrows 25 are absorbed from the surface 10 of the ski 5 which is in an undeformed state. Furthermore, the support device 6 with the web 24 is tightened by the connecting strap 14 in the direction of the sole 9 whereby also if the ski 5 is deformed, the same kind of contact of the sole 9 with the support face 7 is ensued.

This way, steady conditions are achieved during the release process of the toe clamp 1, during which the boot 4 is displaced in the region of the toe clamp 1 or respectively a holding-down device for the sole 26 in a direction running transversely to the longitudinal direction of the ski, independently of the deformation state of the ski 5.

Figure 2:
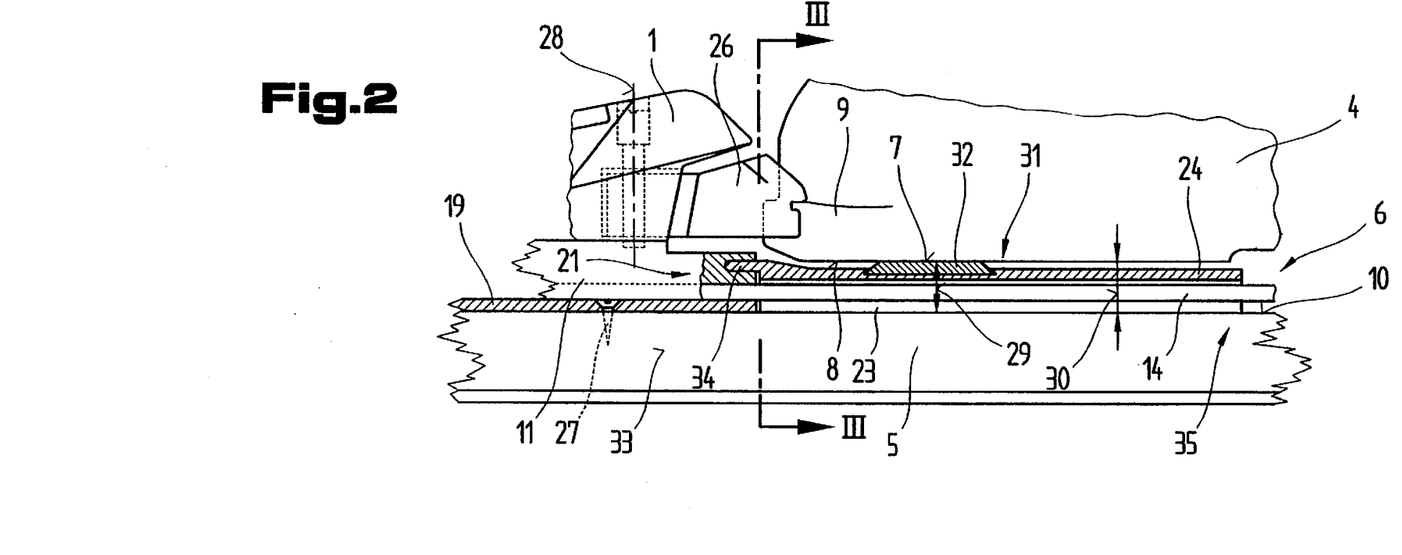
FIG. 2 is a view, partially cut, of a partial region of the support device associated with the toe clamp between a boot and a ski.
Figure 3:
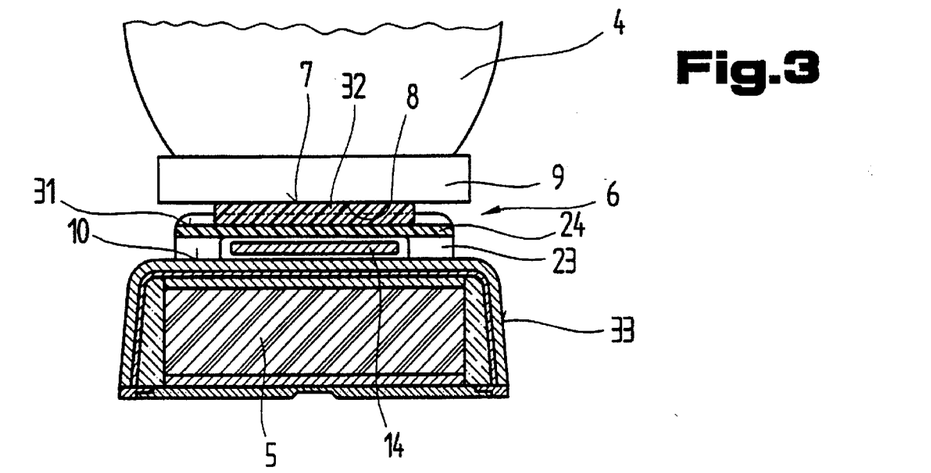
FIG. 3 is a section of the support device taken along the lines III—III in FIG. 2.

FIGS. 2 and 3 show the support device 6 between the ski 5 and the sole 9 in the region of the toe clamp 1.

The base plate 19, which is provided with the guiding arrangement 11 is secured to the surface 10 of the ski 5 by fastening means 27, for example screws. The toe clamp 1 has a holding-down device of the sole 26 which can be displaced about a swivelling axis 28 which runs in a vertical direction to the surface 10 in a plane parallel to the surface 10. By means of said holding-down device the sole 9 of the boot 4 in a fixed condition of the boot 4 is tightened in the direction of the support device 6 between the contact surface 8 of the sole 9 and the surface 10 of the ski 5, whereby a thickness 29 of the support device 6 creates a distance 30 between the contact surface 8 and the surface 10. In the region formed by the distance 30 between the contact surface 8 and the surface 10 runs the connecting strap 14 which is immovably connected with the toe clamp 1 in the direction of the heel clamp 2 which has not been illustrated, whereby the connecting strap 14 runs between the shanks 23 and between the web 24 and the surface 10.

In the web 24, the support device 6 presents a running plate 32 in a guiding arrangement 31 which is at a fight angle to the longitudinal direction of the ski, which forms a support face 7 for the contact surface 8 of the sole 9 and is adjustably mounted in a guiding arrangement 31. In the case of a lateral displacement of the boot 4 or respectively the displacement of the holding-down device for the sole 26 due to lateral forces in the guiding arrangement 31 running transversely to the longitudinal extension of the ski, this running plate 32 is taken along by the sole 9 from a position of rest forming the central position in the direction of the side faces 33 of the ski 5. This is achieved in particular by a greater friction-tightness between the support face 7 and the contact surface 8 with respect to the frictional resistance of the running plate 32 in the guiding arrangement 31. This way, steady release values according to an adjustable size arrangement on the toe clamp 1 are ensured independently of snow, ice, dirt and other changing conditions.

The support device 6 is connected in an articulated manner by means of an extension 34 which is formed by the articulation arrangement 21 facing towards the toe clamp 1. At the end 35 opposite the extension 34, the web 24 of the support device 6 bears on the connecting strap 14 if the ski 5 is not stressed or respectively via the shanks 23 on the surface 10 of the ski 5. When the ski 5 is deformed, in particular bent through, the connecting strap 14 adopts the course of a string with respect to the surface 10 which is curved like the arc of a circle in the longitudinal direction of the ski. In such an operation state the frictional conditions between the support face 7, the contact surface 8 and the sole 9 are not changed since a displacement takes place between the toe clamp 1 which moves along with the surface and the support device 6 in the articulation arrangement 21. This ensures also that the boot 4 is released in such operational states at torsional stresses which are defined by the release values of the toe clamp 1, independently of the angle position between the me clamp 1 or respectively its holding-down device of the sole 26 and the sole 9.

Figure 4:
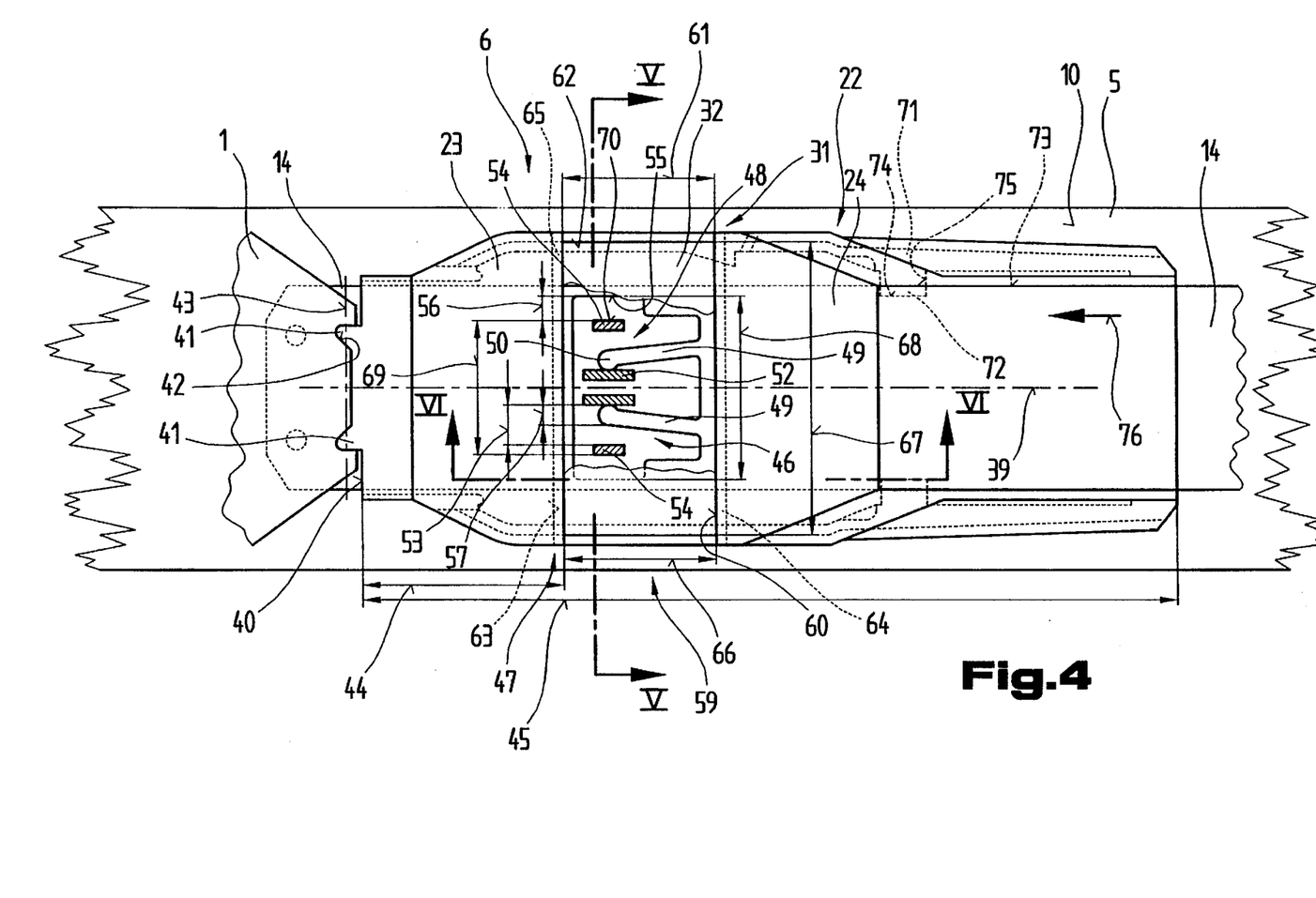
FIG. 4 is a top view, partially cut, of the support device in accordance with the invention with the running plate and the spring device.
Figure 5:
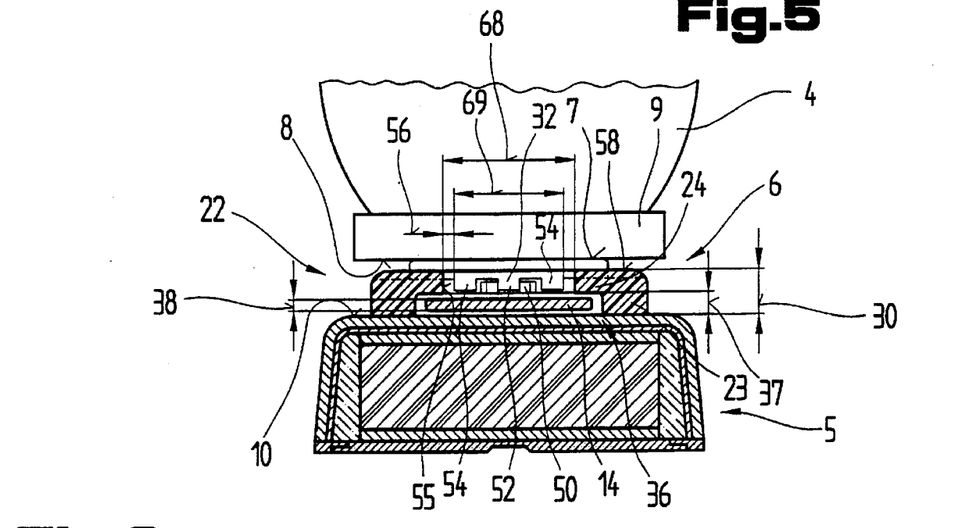
FIG. 5 is a section of the support device in the region of the running plate, taken along the lines V—V in FIG. 4.
Figure 6:
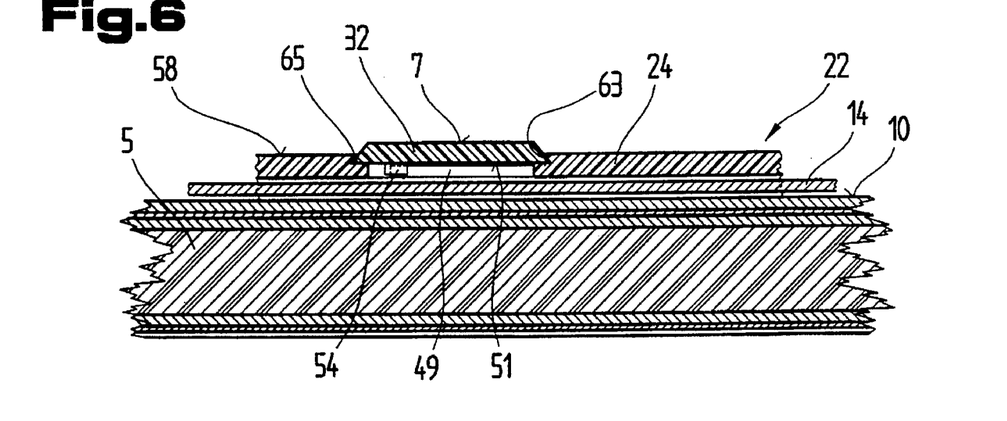
FIG. 6 is a section of the support device, taken along the lines VI—VI in FIG. 4.

FIGS. 4 and 6 show the support device 6 which is arranged on the connecting strap 14 between the surface 10 of the ski 5 and the sole 9 of the boot 4. This device has a C-shaped housing 22 which extends in the longitudinal direction of the ski and is formed by the shanks 23 and the web 24. It forms thereby in the direction of the surface 10 of the ski 5 a tunnel-shaped recess 36 for the connecting strap 14 whereby a depth 37 measured vertically to the surface 10 of the recess 36 is slightly greater than a thickness 38 of the connecting strap 14.

Facing towards the me clamp 1 the housing 22 has symmetrically to the longitudinal central axis 39, projecting beyond an end face 40 of the web 24 two finger-shaped guiding extensions 41, which engage in the recesses 42 of the toe clamp 1 and with respect to the longitudinal central axis 39 are positioned in true alignment with the axis in said toe clamp. However, the guiding extensions 41 and the recesses 42 allow for a displacement of the support device 6 or respectively the housing 22 about a swivelling axis 43 which is formed by the latter and which rims approximately parallel to the surface 10 and at a fight angle to the longitudinal central axis 39.

In a deformation of the ski 5, in particular when it is bent through, the surface 10 is moving away from the connecting strap 14 which connects the toe clamp 1 and the heel clamp 2, and thereby from the support device 6, a tightening of the ski 5 is prevented by the displacement around the swivelling axis 43.

In a distance 44 which corresponds to approximately a quarter of a length 45 of the support device 6, a perforation 46 is arranged in the web 24 of the housing 22, which is spanned over by a running plate 32 which is adjustably positioned in the guiding arrangement 31 running parallel to the longitudinal central axis 39, for example in a dovetail-shaped groove-spring arrangement 47 transversely to the longitudinal direction of the ski. In the perforation 46 symmetrically to the longitudinal central axis 39 two spaced-apart from one another, from an end face of the perforation 46 facing towards the toe clamp 1 and protruding in the direction of the toe clamp 1, finger-shaped spring arms 49 are arranged which form a spring device 48 and which accommodate a dog 52 with an end section 50 between them, which is arranged on an underside 51 of the running plate 32 facing towards a surface 10. The arrangement of the spring arms 49, which is essentially elastically adjustable transversely to the longitudinal central axis 39 and the dog 52 of the running plate 32 which is fixed therebetween causes in an unstressed condition a central position of the running plate 32 with respect to the support device 6 or respectively the longitudinal central axis 39. Associated with the dog 52 in the direction of the shank 23 of the housing 22 two abutment elements 54 are arranged which at a distance 53 extends beyond the underside 51 of the running plate 32 in the direction of the surface 10 of the ski 5, which when a lateral displacement of the running plate 32 takes place cooperate with the side faces 55 of the perforation 46 and limit an adjustment path 56 from a position of rest of the running plate 32 in a vertical direction to the longitudinal direction of the ski. The distance 53 between the dog 52 and the abutment element 54 is smaller than the sum of a width 57 of the spring arms 49 in its end section 50 and the adjustment path 56 between the abutment element 54 and the side face 55 of the perforation 46.

If the running plate 32 is thereby moved transversely to the longitudinal direction of the ski by an outer force, the spring arm 49 which engages in the direction of movement in the dog 52, causes depending on the spring-off a linear increasing readjusting force. If the adjustment of the running plate 32 exceeds the difference between the distance 53 and the width 57, by means of another spring arm 49 which engages in the abutment element 54 an additional readjusting force is created which, linear with the further adjustment of the running plate 32 is acting up to its lateral end position. Consequently, by the arrangement of the spring arms 49 in pairs, a progressive readjusting force is applied to the running plate 32 as a function of the past adjustment path 56 by which the readjustment moment of the toe clamp 1 in order to prevent an early release of the ski binding at short impact stresses is supported by the support device 6. This way, an adjustment or respectively matching of the release behaviour of the toe clamp 1 can be precisely regulated.

The running plate 32 is adjustably mounted with its underside 51 with respect to a surface 58 of the housing 22 in a groove-shaped depression 59 at a fight angle to the longitudinal central axis 39, which together with the running plate 32 forms a dovetail-shaped groove-spring arrangement 47. For this purpose in the groove flanges 60 which are arranged at a distance 61 in the direction of the longitudinal central axis, guiding faces 63 are arranged which are inclined in the direction of a base 62 of the depression 59 and which engage in the guiding extensions 65 which extend beyond the longitudinal side faces 64 of the running plate 32. A width 66 of the running plate 32 is slightly less than the distance 61 of the groove flanges 60.

Independently of its adjustable position the perforation 46 is covered by the running plate 32, for which a length 67 running transversely to the longitudinal central axis 39 is greater than a parallel width 68 thereto of the perforation 46 including the two-fold value of the adjustment path 56 which corresponds to half the value of the difference between the width 68 and a distance 69 of the outer abutment faces 70 of the stopping element 54.

In order to avoid further frictional influences when the boot 4 is displaced between the contact surface 8 and the support device 6, the support face 7 of the running plate 32 extends beyond the surface 58 of the web 24 or respectively the housing 22. Moreover, it is advantageous to design the support face 7 of the running plate 32 with respect to the surface 58 in a convex manner in the direction of the lengthwise extension of the support device 6.

To fix the support device 6 in the longitudinal direction of the ski 5 or respectively on the connecting strap 14, the web 24 of the housing 22 has in a direction vertical to the longitudinal central axis 39 a resilient detent arm 71, which in the direction of the longitudinal central axis 39 presents a projecting latching projection 72 which cooperates with a receptacle 74 which is arranged on the connecting strap 14, for example in a side face 73 facing towards the detent arm 71. By a bent embodiment with respect to the longitudinal extension of the ski 5 of a contact surface 75 between the latching projection 72 and the receptacle 74, a force which acts upon the housing 22 in the direction of the toe clamp 1—according to arrow 76—is achieved, which ensures a safe beating of the guide projections 41 in the receptacles 42 and thereby of the housing 22 of the support device 6 in the toe clamp 1 and prevents a displacement of the support device 6 in the direction of the heel clamp 2 in an effective manner.

Figure 7:
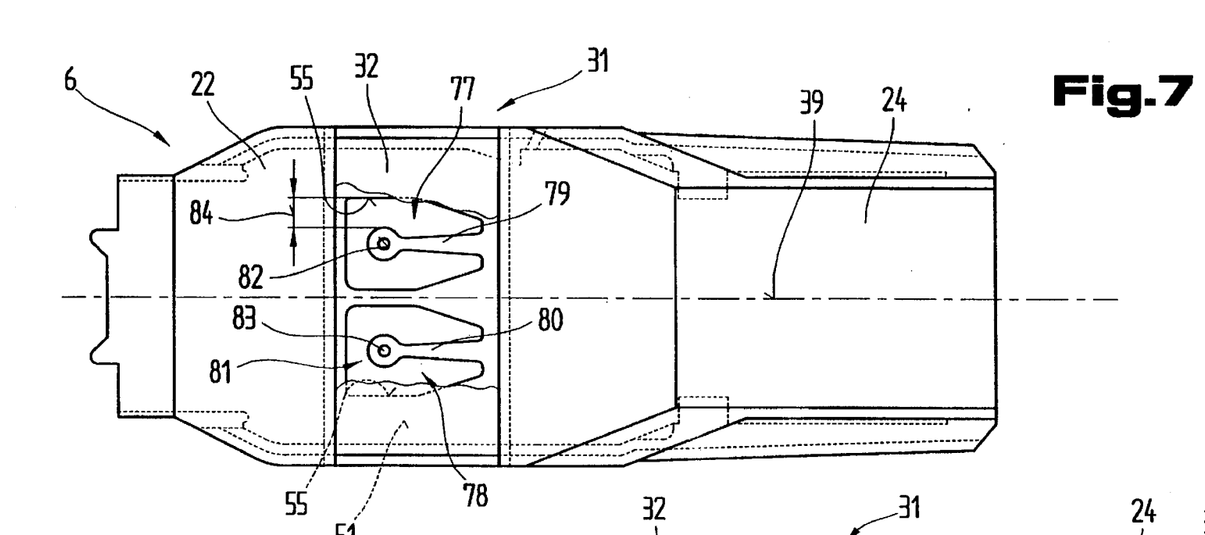
FIG. 7 is a top view, partially cut, of a further embodiment of the support device with the spring arrangement for the running plate.

FIG. 7 shows another embodiment of the housing 22 of the support device 6 in the region of the running plate 32. In this embodiment the web 24 is provided in the region of the guiding arrangement 31 of the running plate 32 with respect to the longitudinal central axis 39 with two symmetrically arranged perforations 77, 78 in which spring arms 79, 80 extend approximately parallel to the longitudinal central axis 39, which at least in a direction vertical to the longitudinal central axis 39 are resilient. End sections 81 of the spring arms 79, 80 are provided with a bore 82 for example, in which connecting pins 83 engage that protrude beyond the underside 51 of the running plate 32.

In this embodiment a lateral displacement of the running plate 32 is counteracted at the same time by the spring force of both spring arms 79, 80. Of course, the movement of the running plate 32 is also limited by the embodiment of stopping elements on the running plate 32 which cooperate with the perforations 77, 78. On the other hand, however, it is also possible to limit the adjustment path by means of a distance 84 between the side faces 55 of the perforations 77, 78 and the spring arms 79, 80.

Figure 8:
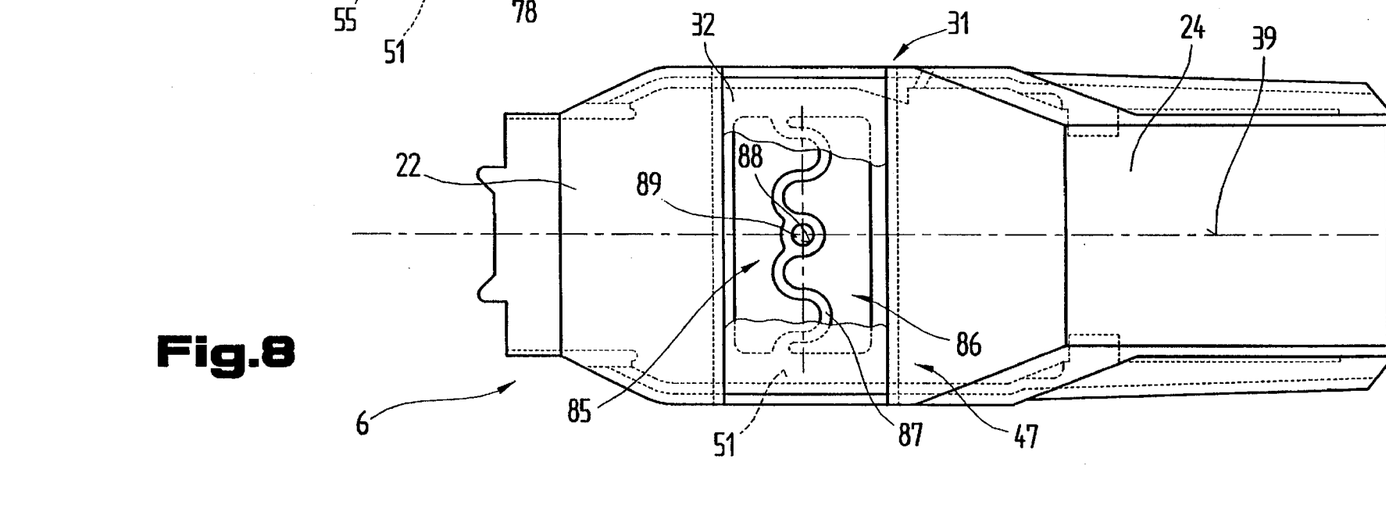
FIG. 8 is a top view, partially cut, of another embodiment of a spring arrangement for the running plate.

FIG. 8 shows another embodiment of the housing 22 of the support device 6 in the region of the running plate 32. In this embodiment two perforations 85, 86 are provided, which are spaced apart from one another in the direction of the lengthwise extension of the support device 6, are arranged between the groove-spring arrangements 47 running vertically to the longitudinal central axis 39 and parallel to each other and forming the guiding arrangement 31 for the running plate 32, with a meander-shaped plastic part 87 between them, which runs transversely to the lengthwise extension of the support device 6. The plastic part 87 has a bore 88 located approximately at the cross-section with the longitudinal central axis 39 to accommodate a connecting pin 89 which is connected with the running plate 32, for example formed on and projecting beyond the underside 51 of the latter. By the meander-shaped embodiment of the plastic part 87 transverse to the longitudinal central axis 39 and in connection with an appropriate elasticity of the material, a spring characteristic is achieved, which as a function of the dimension of the plastic part 87 achieves a linear or progressive spring effect.

Also in this embodiment it is possible by the arrangement of the stopping element of the running plate 32 which extends into the perforations 85, 86 and cooperates with them, to limit the adjustment path of said plate.

The support device 6 respectively the housing 22 can also be designed in such a way that the web 24 in the direction of the toe clamp or respectively the heel clamp 1, 2 is prolongated and is provided with passage bores for the fastening means by which the toe clamp or respectively the heel clamp 1, 2 is fixed on the ski, for example. In guiding arrangements 11 with sliding toe or respectively heel clamps 1, 2, the fastening means can of course only be arranged therebetween and the housing 22 or respectively the web 24. In such a fixing of the housing 22 it is possible, in the region between the fastening means and the running plate 32 to design the swivelling axis 43 in the form of a weakened section, as for example in a so-called strap-hinge. Of course, it is just as well possible to provide an articulation arrangement in this area.

Figure 9:
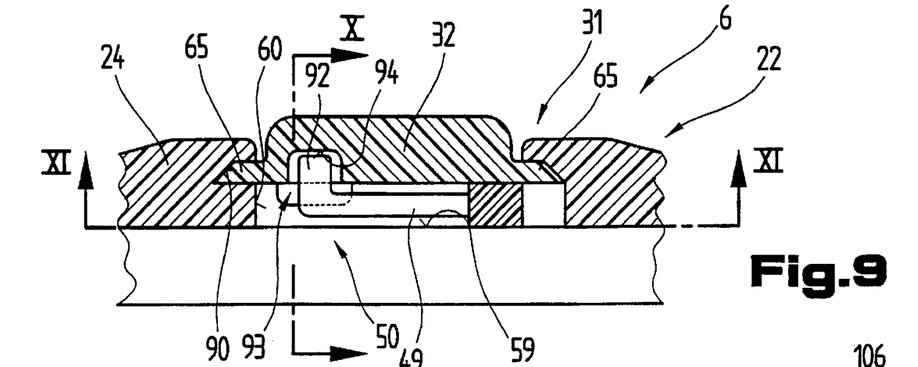
FIG. 9 is a section of a further embodiment of the support device in the region of the running plate, taken along the lines IX—IX in FIG. 10.
Figure 10:
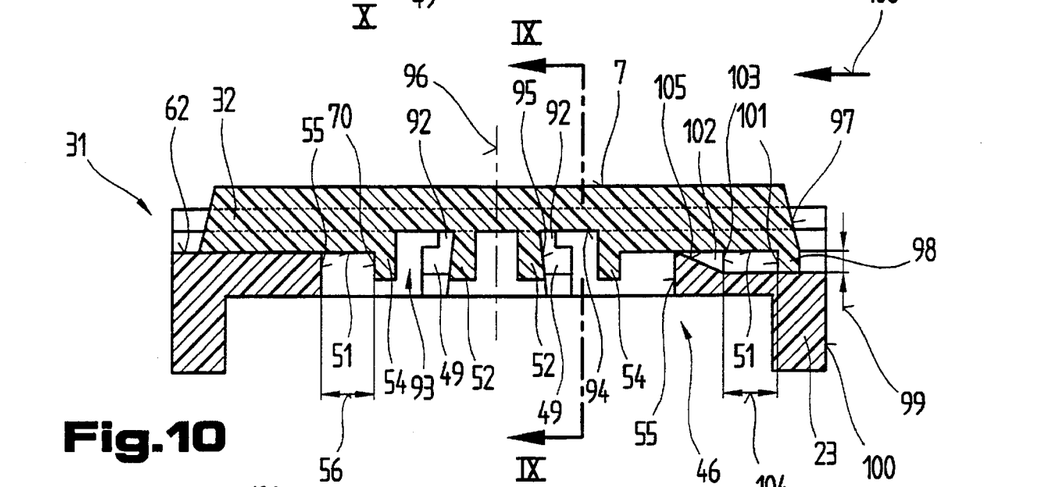
FIG. 10 is a section of the support device taken along the lines X—X in FIG. 9.
Figure 11:
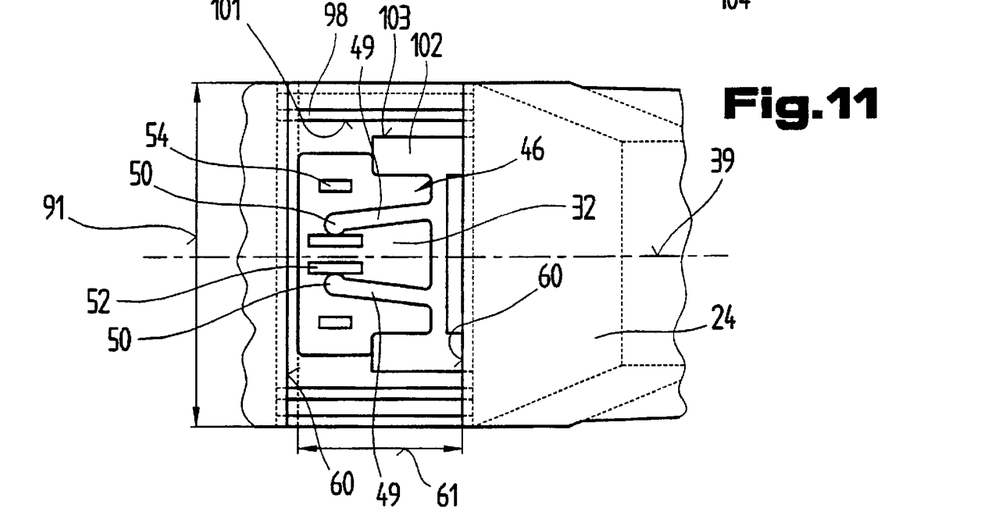
FIG. 11 is a section of the support device taken along the lines XI—XI in FIG. 9.

FIGS. 9 to 11 show another embodiment of the support device 6. In this embodiment the guiding arrangement 31 which is arranged in the web 24 of the housing 22, 90° offset to the lengthwise extension of the ski, for the adjustably mounted running plate 32, is designed in the form of a combination of a flat trajectory and trapezoidal trajectory guidance. The guiding grooves 90 which are arranged in the groove flanges 60 of the depression 59 extend over the entire width 91 of the housing 22. In this guiding groove 90 engage the guiding extensions 65 of the running plate 32. By the embodiment as flat trajectory and trapezoidal trajectory guidance an improved safety against unintentional release of the running plate 32 is achieved on the guiding arrangement 31.

In the region of the perforation 46 of the web 24, the spring arms 49, which cooperate with the dogs 52 or respectively the stopping elements 54 of the running plate 32, are arranged approximately parallel to the longitudinal central axis 39, whereby they are provided in their end sections 50 with projections 92 facing towards running plate 32. Associated with these projections 92 or respectively end sections 50 of the spring arms 49 on the underside 51 of the running plate 32 in the region between the stopping elements 54, which are arranged symmetrically to the longitudinal central axis 39, is a depression 93. With this and in connection with a prestressing of the spring arm 49 in the direction of the underside 51 or respectively a base 94 of the depression 93 a larger bearing surface 95 is achieved between the spring arms 49 and the dogs 52 or respectively the stopping elements 54. The bearing surfaces 95 between the dogs 52 and the spring arms 49 are designed in an inclined manner with respect to a plane of symmetry 96 running through the longitudinal central axis 39 and at a fight angle to the support face 7, whereby when forces are acting upon the spring arms 49 between the spring arms 49 and the dogs 52, a resulting force is produced in the direction of the running plate 32. Consequently, an unintentional release of the spring arms 49 from the depression 93 is effectively avoided.

The running plate 32 has on its underside 51 in the region of a lateral edge 97 a web 98 which protrudes the underside 51, which is approximately at the same level with the stopping elements 54 which project beyond the underside 51 and the dog 52. The base 62 of the housing 22 is lowered by a height 99 of the web 98 from a lateral edge 100. An inner side 101 of the web 98 facing towards the plane of symmetry 96 is facing towards an abutment face 103 formed by a stopping element 102 in the direction of the perforation 46. In a central position of the running plate 32 a distance 104 between the inner side 101 and the abutment face 103 is as great as the size of the adjustment path 56 formed between the abutment face 70 of the stopping element 54 and the side face 55 of the perforation 46. The stopping element 102 extends approximately about half the value of the distance 61 between the groove flanges 60 in the direction of the protruding spring arms 49. In the further region between the stopping element 102 and the other groove flange 60, the lowered section of the base 62 has a mounting guiding face 105 in the direction of the perforation 46, the reason why the guide face 55 of the perforation 46 forms the stopping face for the abutment element 54. Due to the lowered region with the adjacent guiding face 105, an assembly of the running plate 32 in the housing 22 is made possible from the direction of the lateral edge 100 according to an arrow 106, whereby by the web 98 a complete sealing of the guiding arrangement 31 is achieved.

For the production of the support device 6, which consists of the housing 22 and the running plate 32 a plastic material which is suitable for an injection moulding process, such as polyethylene, polyamide and recycling plastics can be used. Particularly advantageous is thereby POM material (polyoxymethylene). However, embodiments in which metal and plastic combinations are used are also possible, for example when housings 22 which are combined with a running plate 32 of plastics are produced by a die casting process.

By combining several plastic materials for the housing 22 and the running plate 32, the coefficient of friction between the latter and also the noise development when the parts are moving to each other can be influenced.

It should also be noted that for clarity of the representation, an illustration has been chosen in the figures wherein the components are partially represented unproportionally to one another.

Merely for the sake of completeness, it has to be mentioned that individual combinations of features characterized in the subclaims or respectively described in the exemplary embodiments, can form their own inventive solutions independently of the characteristics in claim 1.

In particular, the individual embodiments shown in FIGS. 1 to 6; 7; 8; 9, 10, 11 can form the object of own solutions in accordance with the invention. Relating tasks and solutions are apparent from the detailed descriptions of these figures.

What is claimed is:

1. A support device arranged between a sole of a boot and a piece of sports apparatus, the piece of sports apparatus having an upper surface and a longitudinally extending axis, and the piece of sports apparatus carrying a toe clamp and a heel clamp holding the boot on the piece of sports apparatus, and the support device comprising
    (a) a housing secured to the piece of sports apparatus and having an end section facing one of the clamps, the one clamp being displaceable in the direction of the longitudinally extending axis,
        (1) the housing end section being mounted on the piece of sports apparatus in a predetermined vertical position relative to the upper surface,
    (b) a sole support plate freely slidably mounted on the housing end section for relative displacement independently of any displacement of the one clamp along a displacement path transversely to the longitudinally extending axis against a bias of a spring means holding the sole support plate in a rest position, and
    (c) an articulation arranged to permit the housing end section facing the one clamp to be freely adjustable in a direction extending vertically from the upper surface about a pivot axis extending transversely to the longitudinally extending axis and parallel to the upper surface in response to flexing the piece of sports apparatus in said direction.

2. The support device of claim 1, further comprising a device coupling the clamps to each other, the coupling device comprising a spacer member between the toe and heel clamps, further comprising a spring-loaded detent arm arranged between the housing and the spacer member.

3. The support device of claim 2, wherein at least a portion of the detent arm is positioned in a guide slot extending in the direction of the axis, and the detent arm is pivotal in a direction extending transversely to the axis into engagement with a stop projecting from the spacer member.

4. The support device of claim 1, wherein the housing is comprised of two shanks and a web connecting the shanks, and further comprising a device coupling the clamps to each other and being guided in the housing.

5. A support device arranged between a sole of a boot and a piece of sports apparatus, the piece of sports apparatus having an upper surface and a longitudinally extending axis, and the piece of sports apparatus carrying a toe clamp and a heel clamp holding the boot on the piece of sports apparatus and a coupling device formed by a spacer member coupling the clamps to each other and being freely movable vertically relative to the upper surface, and the support device comprising
    (a) a housing secured by means of an articulation arrangement to the piece of sports apparatus and having an end section facing one of the clamps, the one clamp being displaceable in the direction of the longitudinally extending axis,
        (1) the housing end section being mounted on the piece of sports apparatus in a predetermined vertical position relative to the upper surface, and an opposite housing end section being held by the freely movable spacer member, the opposite housing end section being freely movable vertically relative to the upper surface with the spacer member, and
    (b) a sole support plate freely slidably mounted on the opposite housing end section for relative displacement independently of any displacement of the one clamp along a displacement path transversely to the longitudinally extending axis against a bias of a spring means holding the sole support plate in a rest position.

6. The support device of claim 5, wherein the housing extends in the direction of the axis and comprises a web and two shanks extending from the web towards the surface, the web and shanks defining a tunnel receiving the coupling device.

7. The support device of claim 1 or 5, wherein the housing comprises a guide for the sole support plate, the guide extending transversely to the axis.

8. The support device of claim 7, wherein the guide comprises a transversely extending groove-like depression in the housing.

9. The support device of claim 8, wherein the groove-like depression is defined between opposite flanks, and the flanks have guide faces extending over part of the length of the groove-like depression and being oriented in opposite directions with respect to the axis.

10. The support device of claim 9, wherein the guide faces are inclined from a surface of the housing to a base of the groove-like depression whereby a dove-tailed guide for the sole support plate is formed.

11. The support device of claim 9, wherein the sole support plate has a width extending in the direction of the axis and not exceeding a distance between the opposite flanks, the sole support plate having guiding extensions projecting from side faces of the sole support plate and engaging the guide faces.

12. The support device of claim 8, wherein the housing defines an opening in alignment with the groove-like depression and the opening has a width extending perpendicularly to the axis, the width of the opening being smaller than a length of the sole support plate extending in the direction of the width by twice the length of the displacement path of the sole support plate in the guide.

13. The support device of claim 8, wherein the housing defines an opening in alignment with the groove-like depression and the opening has a width extending perpendicularly to the axis, the sole support plate has an underside facing a base of the groove-like depression and comprises stop plates projecting from the underside and extending transversely to the axis, the stop plates having abutment faces facing away from each other and being spaced a distance smaller than the width of the opening by twice the length of the displacement path of the sole support plate in the guide.

14. The support device of claim 1 or 5, wherein the sole support plate has an underside, comprising a dog projecting from the underside and engaging the spring means for positioning the sole support plate in the rest position.

15. The support device of claim 14, wherein the housing has an opening covered by the sole support plate, and the spring means is integral with the housing.

16. The support device of claim 15, wherein the sole support plate comprises stop plates projecting from the underside and extending transversely to the axis, the spring means comprises two spring arms extending substantially parallel to the axis between the stop plates, and the dog is centered between the spring arms.

17. The support device of claim 16, wherein the spring arms have ends wherebetween the dog is centered, and a distance between the stop plates is smaller than the length of the displacement path of the sole support plate in the guide less a width of the spring arm ends.

18. The support device of claim 1 or 5, wherein the housing defines bores for receiving means for securing the housing to the piece of sports apparatus and comprises a guide for the sole support plate, the guide extending transversely to the axis and the pivot axis being arranged between the bores and the guide.

19. The support device of claim 1 or 5, wherein the housing comprises guide projections extending towards the one clamp, and the one clamp defines recesses receiving the guide projections for centering the housing.

20. The support device of claim 1 or 5, wherein the sole support plate has a hardness which is less than a surface hardness of the housing.

21. The support device of claim 1 or 5, wherein the sole support plate has a greater surface friction than the surface friction of the housing.

22. The support device of claim 1 or 5, wherein the spring means is arranged in the housing and comprises two spring arms arranged symmetrically at respective sides of the longitudinally extending axis and extending parallel thereto.

23. The support device of claim 1 or 5, wherein the spring means is comprised of a meandering plastic part extending transversely to the longitudinally extending axis and attached to the sole support plate.

* * * * *